United States Patent
Gibson

[11] 4,213,502
[45] Jul. 22, 1980

[54] SELF TRIPPING DAMMER

[76] Inventor: John D. Gibson, Rte. B, Lamesa, Tex. 79331

[21] Appl. No.: 51,705

[22] Filed: Jun. 25, 1979

[51] Int. Cl.³ .............................................. A01B 35/18
[52] U.S. Cl. .......................................... 172/1; 172/64; 172/90; 172/143; 172/237
[58] Field of Search ............... 172/1, 64, 90, 528–530, 172/143, 237

[56] References Cited
U.S. PATENT DOCUMENTS

| | | | |
|---|---|---|---|
| 2,098,738 | 11/1937 | Campbell | 172/143 X |
| 2,187,051 | 1/1940 | Peacock | 172/143 X |
| 2,187,262 | 1/1940 | Brown | 172/237 |
| 2,780,975 | 2/1957 | Gunning | 172/143 |

*Primary Examiner*—Paul E. Shapiro
*Attorney, Agent, or Firm*—Wendell Coffee

[57] ABSTRACT

A dammer having three legs with a foot on the end of each leg is towed behind agricultural cultivating implements. Each foot slides flat against the earth until the weight of the soil causes the dammer to rotate, at which time the dammer rotates one-third of a revolution dumping one dam and continuing to form another.

9 Claims, 5 Drawing Figures

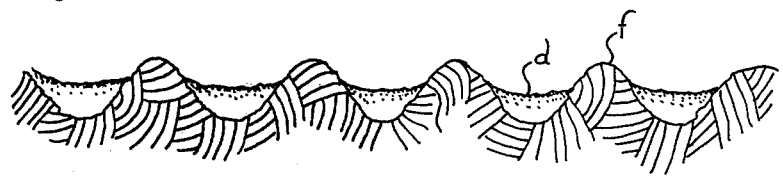
Fig. 1
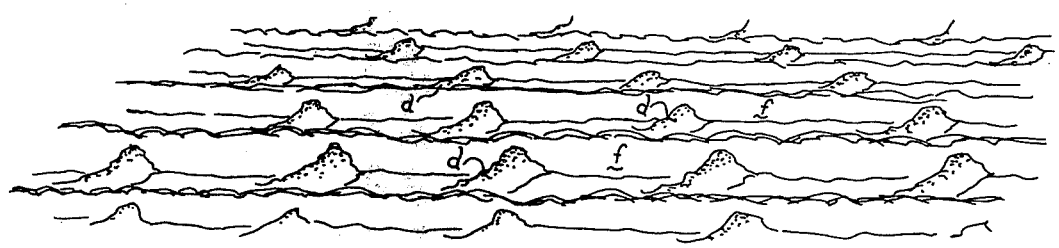
Fig. 2
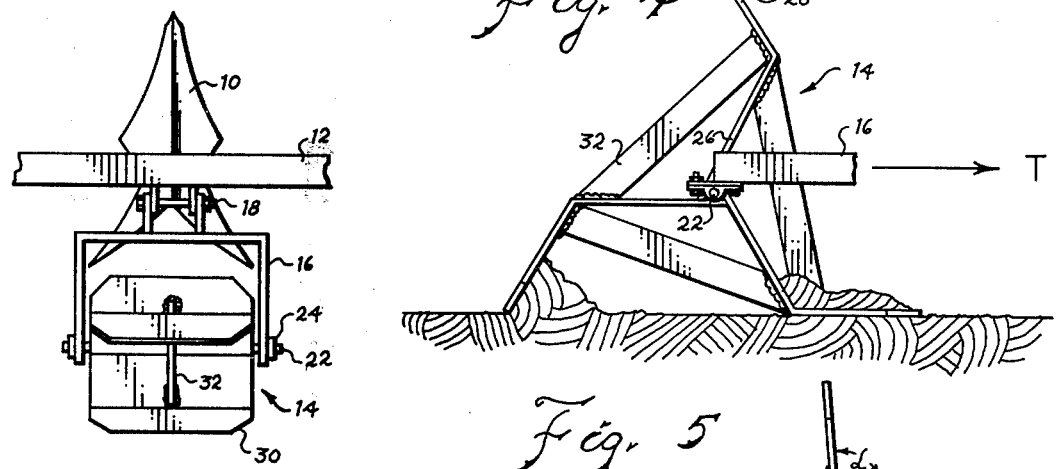
Fig. 4
Fig. 3
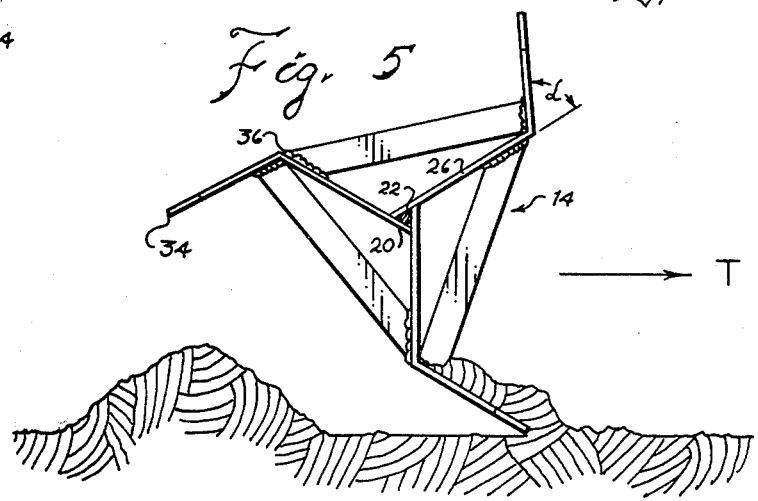
Fig. 5

SELF TRIPPING DAMMER

BACKGROUND OF THE INVENTION

(1) Field of the Invention

This invention relates to agricultural earth working implements and more particularly to an intermittently rotating dammer.

(2) Description of the Prior Art

Dammers are known in agricultural practices as those implements which periodically form a dam in a furrow. The dam holds water in a specific place along the furrow and prevents it from flowing along the furrow. One type of dammer is to have a shovel or hoe-like implement attached by a long arm behind a draft vehicle. The implement is periodically lifted to leave a dam in the furrow. Different mechanisms have been developed for periodically lifting the implement but they all involve mechanisms of different degrees of complexity.

Before this application was filed, applicant had a patentability search made in the United States Patent and Trademark Office. The following references were found on this search:

KAUFMAN U.S. Pat. No. 319,722; ELLIOT U.S. Pat. No. 2,193,275; SILVER U.S. Pat. No. 2,196,038; VRATIL U.S. Pat. No. 2,233,331; NIELSEN U.S. Pat. No. 2,236,832; DAVIS U.S. Pat. No. 3,923,103.

VRATIL discloses what he identifies as a damming attachment for plows. It is shown attached to a flat breaking plow and applicant believes that it should more accurately be characterized as a puddling attachment. It appears to applicant that it would scoop out small depressions or ponds or puddles and leave a little pond along with a little hill adjacent to it. It operates by extending at an angle to the direction of draft and the hub of the implement is also at an angle to the direction of draft. As the four blades upon the implement rotates, each scoops up a little pond or depression in the soil in the field which is otherwise in a flat, unfurrowed condition.

ELLIOT, NIELSEN and SILVER each discloses three or four legs or paddles on a hub which are restrained from rotating by a trip mechanism. When the trip is released, the paddle wheel is permitted to rotate to form a dam within the furrow.

The remaining two patents seem to applicant not to be as pertinent as those specifically discussed above.

SUMMARY OF THE INVENTION

(1) New and Different Function

I have invented a dammer adapted to form dams in the furrow which is completely free of all triggers or catches or mechanisms to restrain its rotation, except for the shape of the damming equipment itself.

Specifically, I accomplish this by placing a foot upon the end of each leg or paddle so that the foot lies in the same plane as the toe of the trailing foot. Although I have had some success using four legs to the damming equipment, I prefer to use three. In operation one foot will be horizontal with the foot facing forward to gather dirt or soil upon the foot. With it sliding along the bottom of the furrow the foot immediately behind it has its toe at the same level as the preceding foot to scoop dirt and carry what dirt it has along with it. When the two feet in contact with the bottom of the furrow accumulate sufficient loose soil to overcome the weight of the implement and the yoke which tows it, the weight of soil will cause the implement to rotate one-third of a revolution. As it rotates it will rise up or bump along. As soon as it starts rotating, the toe of the forward foot bites into the bottom of the furrow causing it to continue its rotation. The rotation will lift the trailing foot upward to form a smooth dam without the foot knocking the crest from the dam as it rises.

Therefore, it may be seen that the function of the entire combination far exceeds the function of the individual yokes, axle, feet, etc.

(2) Objects of this Invention

An object of this invention is to form dams in cultivated agricultural fields.

Further objects are to achieve the above with a device that is sturdy, compact, durable, lightweight, simple, safe, efficient, versatile, ecologically compatible, energy conserving, and reliable, yet inexpensive and easy to manufacture, install, operate and maintain.

Other objects are to achieve the above with a method that is versatile, ecologically compatible, energy conserving, rapid, efficient, and inexpensive, and does not require skilled people to install, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a sectional view of dammed furrows in a cultivated agricultural field.

FIG. 2 is a perspective view thereof.

FIG. 3 is a top plan view of a dammer according to this invention attached a tool bar also carrying a lister.

FIG. 4 is a side elevational view of the dammer and part of the yoke.

FIG. 5 is a side elevational view of the dammer when it is tripping.

DESCRIPTION OF THE PREFERRED EMBODIMENT

Referring to the drawing, there may be seen a series of beds f with furrows between them and dams d in the furrows. FIG. 2 shows a different view of the beds f with the dams d. It may be seen that rain (or water applied by other means to the field) will be prevented by the dams d from running down the furrows between the beds f.

Referring to FIG. 3, there may be seen lister 10 attached to tool bar 12. Other type plows besides the lister 10 could be attached to the tool bar 12. Dammer 14 is pulled behind the tool bar 12 by yoke 16. The yoke forms draft means for pulling the dammer 14 through the field. The yoke 16 is connected to the tool bar by horizontal pivot bolt 18. In most situations, the yoke 16 will be attached to the shank carrying the plow but in all events the yoke 16 will be pivoted about a horizontal pivot normal to the direction of draft T so that it is free to swing up and down as required by the motion of the dammer as it rotates.

The dammer 14 has hub 20. Referring to FIG. 3, the yoke 16 is U-shaped and the yoke extends on each side of the hub. Axle 22 extends through the hub 20 and through the yoke 16. I prefer to place bearings 24 at the yoke 16 so that the axle is free to rotate in the yoke and the dammer is attached rigidly to the axle.

Three legs 26 extend from the hub 20. As stated above, there may be four legs, however, I have had better success using three legs. The legs are somewhat paddle shaped and basically extend in a radial plane from the hub 20. FIG. 5 shows the three legs 26 forming a small triangle at the hub for structural and fabrication purposes.

Foot 28 is attached to the distal end of each leg 26. The distal portion of the foot is shaped by beveling the corners at 30 so that it basically follows the contour of the furrow. Braces 32 extend from one foot to the distal end of the preceding leg to hold and maintain the dammer rigid. The construction of all parts of the dammer is conveniently by welding. The extreme tip or distal edge of each foot is referred to as toe 34. The legs and feet are proportioned so that each foot lies in a plane extending through the toe of the trailing foot.

I have had good success using a one inch axle 22 and using a leg of nine inches. This means bend 36 between the leg and the foot is about eight inches from the axis of the dammer 14. The foot extends six inches from the bend 36 to the toe 34. I.e., the foot is about ¾ of the length of the leg if the length of the leg is taken as the distance from the axis to the bend 36. Stated another way, the leg is about one and one-third as long as the foot. The foot will be at an angle alpha to the leg of about 57°. However, the angle is not so critical as the fact that the plane of the foot includes the toe of the trailing foot.

Referring to FIG. 4, it may be seen that when the lower most foot 28 is flat along the bottom furrow, the toe of the trailing foot will also be against the bottom furrow. Loose dirt will collect upon the flat foot which is forward and also will be carried along by the trailing foot. When the drag of the dirt that is being carried along is sufficient to cause the dammer to rotate, as seen in FIG. 5, the axle 22 will rise inasmuch as yoke 16 is pivoted at the bolt 18. It may be seen with this rise, toe 34 of the forward foot 28 will dig into the loose soil to continue the rotation of the dammer. At this point the back foot rises almost vertically thus clearing the dam which is thus formed.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| | |
|---|---|
| 10 lister | 28 foot |
| 12 tool bar | 30 corner |
| 14 dammer | 32 brace |
| 16 yoke | 34 toe |
| 18 bolt | 36 bend |
| 20 hub | f - bed |
| 22 axle | d - dams |
| 24 bearing | T - direction of draft |
| 26 legs | |

SUBJECT MATTER CLAIMED FOR PROTECTION

I claim as my invention:
1. A self tripping dammer comprising:
   a. a hub through the dammer,
   b. a yoke extending on each side of the hub forming
   c. draft means for pulling the dammer through a cultivated field,
   d. an axle through the hub and the yoke,
   e. at least three legs radiating from said hub, and
   f. a foot on the distal end of each leg,
   g. each foot angled to its leg,
   h. the distal end of each foot called a toe,
   j. each foot lying in a plane extending through the toe of the trailing foot.
2. The invention as defined in claim 1 further comprising:
   k. the foot angled to the leg at about 57°.
3. The invention as defined in claim 1 further comprising:
   k. the length of the foot being about ¾ the length of the leg.
4. The invention as defined in claim 1 further comprising:
   k. said yoke pivoted about a horizontal pivot behind a plow, so that the dammer runs in a furrow made by the plow.
5. The invention as defined in claim 1 wherein:
   k. there are less than four legs.
6. The invention as defined in claim 5 further comprising:
   l. said yoke pivoted about behind a plow, so that the dammer runs in a furrow made by the plow.
7. The invention as defined in claim 6 further comprising:
   m. the length of the foot being about ¾ the length of the leg.
8. The invention as defined in claim 7 further comprising:
   n. the foot angled to the leg at about 57°.
9. The method of damming a cultivated agricultural field comprising:
   a. towing a three-legged dammer behind a draft vehicle,
   b. preventing the dammer from rotating about a central hub by
   c. skidding a foot on one of the down legs flat along the earth, and
   d. rotating the dammer ⅓ revolution responsive to soil build-up on the feet thereby
   e. dropping a dam at each ⅓ revolution.

* * * * *